United States Patent

[11] 3,619,647

[72] Inventor William H. Barkow
Pennsauken, N.J.
[21] Appl. No. 761,199
[22] Filed Sept. 20, 1968
[45] Patented Nov. 9, 1971
[73] Assignee RCA Corporation

[54] STAIRCASE VOLTAGE GENERATORS
11 Claims, 6 Drawing Figs.

[52] U.S. Cl. .......... 307/227, 178/5.4 PE, 307/88 MP, 307/252 K, 307/284, 307/314, 328/186
[51] Int. Cl. .......... H03k 3/35, H03k 4/02
[50] Field of Search .......... 328/39.5, 186, 65; 307/227, 314, 282, 284, 252 Q, 252 L, 252 T, 252 J, 252 K, 88 MP; 315/14; 178/5.4 PE

[56] References Cited

UNITED STATES PATENTS

| | | | |
|---|---|---|---|
| 3,117,308 | 1/1964 | Sublette | 307/314 |
| 3,155,844 | 11/1964 | Auld | 307/227 |
| 3,204,143 | 8/1965 | Pritchard | 178/5.4 |
| 3,372,298 | 3/1968 | Merryman | 315/14 |
| 3,421,024 | 1/1969 | Anderson et al. | 307/314 |
| 3,424,939 | 1/1969 | Clingman | 315/14 |
| 3,439,217 | 4/1969 | Shortes | 315/14 |
| 3,478,245 | 11/1969 | Barkow | 315/13 |
| 3,492,416 | 1/1970 | Weber | 178/5.4 |
| 3,496,405 | 2/1970 | Mankus | 307/227 |

*Primary Examiner*—Donald D. Forrer
*Assistant Examiner*—L. N. Anagnos
*Attorney*—Eugene M. Whitacre ABSTRACT: A multilever staircase generator employs a transformer having a core fabricated from a square loop magnetic material. The secondary winding of the transformer is shunted by a capacitor while the primary winding forms part of a controllable current loop, whose path is selected by activation of a suitable thyristor. During a first mode the secondary capacitor is charged to a stepped up, high-voltage level by causing a lower voltage to appear across the primary winding, after the activation of a first thyristor. A second mode occurs after the secondary capacitor transfers sufficient energy to saturate the secondary winding inductance and cause core switching; at which time the capacitor is charged to an opposite polarity. A third mode is provided by activating a second thyristor, which causes the secondary capacitor to transfer the energy stored thereby to a reactive impedance element located in the primary winding and switched into a suitable path by said thyristor activation.

INVENTOR
WILLIAM H. BARKOW
BY Eugene M. Whitacre
ATTORNEY

INVENTOR
WILLIAM H. BARKOW
BY Eugene M. Whitacre
ATTORNEY

STAIRCASE VOLTAGE GENERATORS

STAIRCASE VOLTAGE GENERATORS

The present invention relates to improvements in the generation of staircase voltage waveforms and more particularly to improved sources of electrical waveshapes suitable for velocity modulating an electron beam of a penetration type kinescope.

It has been known to produce color television images by the use of a shadow mask kinescope employing three guns. In such systems the viewing screen of the kinescope has deposited on a surface thereof a plurality of phosphor dot arrays. Each array includes dots or particles of phosphor which fluoresce in different colors such as red, green and blue. The shadow mask in conjunction with the three electron guns, permits an electron beam from a given gun to only activate a selected one of the three phosphor dots, thereby producing the color associated with that dot. The above techniques for obtaining adequate resolution and overall picture quality, place stringent requirements on the structure and specifications of the kinescope. Accordingly the mechanical tolerances between the shadow mask assembly, gun and the screen are quite critical and great care has to be taken in the manufacture of such display devices.

The prior art shows that using conventional signal standards, a color display can also be produced by another type of kinescope referred to as a penetration device. In such devices the screen has deposited thereon a plurality of superimposed phosphors. For example, for use in a full color television system, the screen of the penetration tube would have phosphors deposited thereon which produce a red, green and blue light. These phosphors would be deposited upon the screen in layers and not confined to any particular location, or within an array, as dictated by the shadow mask structure. Each of these phosphors is then excitable by a different velocity electron beam, to produce the required color.

Kinescopes employing penetration techniques are simpler to produce as the mechanical tolerances, and so on, are far less critical than those associated with the three gun shadow mask assembly.

However, a problem is encountered in conveniently modulating or varying the velocity of the electron beam. Prior art techniques suggest utilizing three electron guns associated with a penetration type phosphor screen. In such techniques each gun is biased with respect to the screen at a different potential, thereby emitting a different velocity beam according to this potential. This approach, while providing a solution still requires the use of three guns. To use a single gun for producing a color display, one can change the accelerating potential between the screen of the kinescope and the gun or cathode by switching the voltage on the screen between the various high voltage levels necessary to excite the superimposed phosphors. However, in view of the large magnitude voltages required to impart suitable velocities to an electron beam, and in view of the large voltage differences necessary to excite individual phosphors, it has been found difficult and expensive to generate a staircase waveform, which when applied to the screen of a penetration device, provides the high level steps necessary to velocity modulate the electron beams.

It is an object of the present invention to provide improved circuitry for producing a high potential stepped electrical wave.

Another object is to provide an improved circuit for generating a staircase voltage for application to the screen of a penetration type kinescope.

A further object of the present invention is to provide an improved, economical generator of a triple step waveform at high voltage levels.

A staircase voltage generator in accordance with one embodiment of the invention includes an inductive element having a winding on a core of square loop material. A capacitor is in shunt with a portion of the winding and forms an LC circuit with the inductance element. A switching device is selectively activated to couple a voltage supply to the LC circuit to cause the capacitor to charge to a first potential level. When the capacitor is charged the switching device is inactivated and the capacitor begins to transfer energy to the inductive element. After a predetermined time sufficient energy is transferred to the inductance to cause it to saturate. The saturation of the inductance substantially lowers the reactance and the capacitor is recharged rapidly at a frequency determined by the substantially reduced LC product. At the end of this interval the charge on the capacitor is of an opposite polarity because of the resonant energy transfer.

The capacitor again begins to transfer energy to the inductance but before saturation can again take place a second switching device is activated which causes the capacitor to discharge rapidly.

Other embodiments to be described herein utilize energy recovery techniques and further reduce power requirements for the overall system. The techniques described herein, as above, only require one charge cycle to produce a three step waveform instead of two, thereby reducing the power requirements by one-half.

For a better understanding of the invention, reference will now be made to the following detailed description taken in connection with the accompanying drawings, in which.

Figure 1:
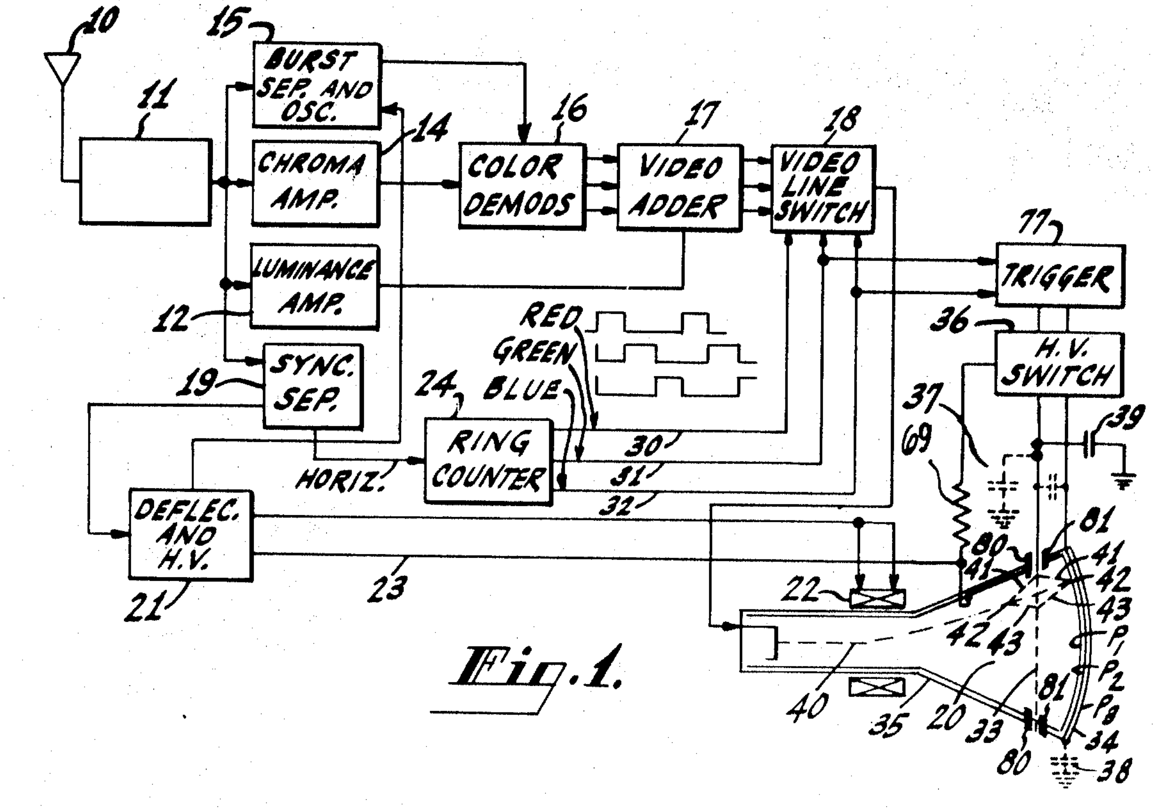
FIG. 1 is a schematic circuit diagram partially in block form of a color television receiver using a single beam penetration type kinescope and associated circuitry.

With reference to FIG. 1, a receiving antenna 10 for intercepting radiofrequency (R.F.) television signals is coupled to the input section 11 of a television receiver which includes the usual tuner, intermediate frequency (I.F.) amplifier and video detector. The intercarrier beat between the sound and picture carrier of the television signal are derived from the I.F. amplifier and applied to a sound channel, not shown, for detection of the f.m. sound signal. The sound signal is applied to a suitable audio amplifier and speaker.

As in a conventional shadow mask type receiver, the composite video signal is applied to an input of a luminance amplifier 12 and a chrominance or chroma amplifier 14. The luminance amplifier which includes a delay line serves to amplify the relatively wide bandwidth monochrome information contained in the composite signal. The chroma amplifier 14 serves to process a high frequency, narrow bandwidth signal containing color information in the composite signal pertinent to the production of a color scene.

A burst separator and color oscillator circuit 15 is used to separate and retrieve color bursts which appear on the back porch of a horizontal synchronizing pulse during a color transmission, and which determine color reference subcarrier frequency necessary to retrieve color information. The color bursts are used to synchronize the color oscillator.

One output terminal of the burst separator and oscillator 15 is coupled to an input terminal of the color demodulators 16. Another input terminal of the color demodulators 16 is coupled to the chroma amplifier 14 to receive the amplified chrominance signal. The function of the color demodulators 16 is to demodulate the chrominance information contained in the amplified signal from chroma amplifier 14, and to provide at suitable output terminals thereof a plurality of color difference signals, such as the R-Y, B-Y and G-Y signals. Techniques to obtain color difference signals may include suitable matrixing networks coupled to the demodulator 16 outputs.

The three color difference outputs from the demodulators 16 are applied to three input terminals of a video adder circuit 17. The adder circuit 17 has a fourth input terminal coupled to the luminance amplifier 12. The function of the adder 17 is to combine the color difference signals with the luminance or Y signal to obtain therefrom three signals representative of the primary colors utilized for producing a color display, namely red, green and blue. The three color signal outputs from the video adder 17 are applied to three separate inputs of a video line switch 18 which drives the cathode electrode of a penetration type kinescope 20.

A sync separator circuit 19 is coupled to receive the composite video signal and functions to separate the synchronizing components from the composite signal. The separated horizontal and vertical synchronizing information is applied to the deflection circuits 21. The deflection circuitry 21, under control of the synchronizing signals, provides vertical and horizontal sweep signals for the yoke 22 to produce a synchronized raster for proper display of the color picture. The deflection circuitry 21 includes suitable high voltage circuitry to produce voltage levels necessary to properly operate the kinescope 20. For example such levels provide suitable magnitude accelerating voltages for the electron beam in order to obtain adequate brightness and optimum phosphor excitation. The lead designated as 23 connects the high voltage circuitry with the kinescope 20.

The circuitry described above may be similar to that used in currently available color television receivers.

The receiver of FIG. 1 additionally includes a ring counter 24 with an input terminal coupled to receive horizontal synchronizing pulses from the sync separator circuitry 19. The ring counter 24 functions to divide the horizontal synchronizing pulses by a factor of three. Examples of ring counters, including binary or bistable flip-flops are shown in a text entitled Pulse and Digital Circuits, McGraw Hill (1956) by Millman and Taub, Chapter 11 entitled "Counters". Three output signals emanating from ring counter 24 and applied to three input terminals of the video line switch 18 are sequentially occuring pulses of equal width with each of the pulse trains having a repetition rate of one-third of the horizontal line rate.

When the ring counter 24 impresses a pulse of one horizontal line duration on the conductor 30, the video line switch 18 is conditioned to pass the signals from the video adder 17, which correspond to the red image. During this interval the signals corresponding to the green and blue images are blocked. The following pulse from the ring counter 24, also of one horizontal line duration is impressed on the conductor 31 to cause the video line switch 18 to pass the green signals. The third pulse, impressed on the conductor 32 enables the video line switch 18 to pass the blue signals. At the fourth pulse the sequence begins again as can be seen from the wave shapes included in FIG. 1, and designated as red, green and blue. Interline flicker effects may result if the order of color line sequence is not chosen properly when using the normal 525 line interlace scanning system. Fixed line sequence has been found to be relatively free of flicker effects. In the fixed line system the scan lines of the first field alternate as red, green, blue, red, green, blue and so on. The scan lines of the second field also alternate in the same manner and consequently fall in between those of the first field to give color interlace. The resulting line order of the interlace frames will be red, blue, green, red, blue, green and so on. The fixed line sequence system therefore results in approximately 175 lines of each color so that the vertical color resolution is reduced. A coarse line structure particularly in solid areas of red, green and blue is produced unless some method to suppress the line structure is used. However, the reduced vertical resolution of a line sequence color system has not been found to be objectionable in receivers employing a relatively small kinescope.

The kinescope 20 of FIG. 1 employs a single gun and produces a single electron beam. A high transmission mesh 33 is mounted reasonably close to an aluminized phosphor screen 34. The phosphor screen 34 may be a multilayer type screen which contains three different excitable phosphors generally designated as $P_1$, $P_2$ and $P_3$. Examples of suitable screen, phosphors and configurations may be had by referring to U.S. Pat. No. 3,204,143 entitled "PENETRATION COLOR SCREEN, COLOR TUBE AND COLOR TELEVISION RECEIVER" by Dalton H. Pritchard issued on Aug. 31, 1965. The kinescope 20 further includes a funnel coating 35 located on the inside of the glass envelope or bulb. The funnel coating 35, mesh 33 and phosphor screen 34 are electrically separated by insulating members 80 and 81.

The phosphor screen 34 is connected to one terminal of a high voltage switch 36 whose action is controlled by a suitable trigger circuit 77. The trigger circuit 77 receives two input pulses developed by the ring counter 24, and is responsive to these pulses to cause the high voltage switch 36 to apply the proper voltage level to the phosphor screen 34 compatible with the color signal applied to the cathode of the kinescope. The phosphor screen voltage is switched during the horizontal retrace time and is maintained at a relatively fixed value during the succeeding line scan to obtain the desired primary color.

The mesh 33 generally is used to suppress the color fringing that would normally result from switching the screen potential, and provide constant accelerating voltage for the gun. The particular purpose of the mesh 33 and the separate electrical connections to the phosphor screen 34, the mesh 33 and the funnel coating 35 is to permit control of the electron beam velocity and landing position for various colors being produced. The voltage applied to the screen 34 determines the color of the line emitted. The voltage on the cone or funnel coating 35 is obtained from the high voltage lead 23 coupled thereto and is held constant at this level to provide a constant velocity, well formed electron beam in the deflection region of the kinescope 20. The voltage on the mesh 33 is obtained by coupling the mesh to another output terminal of the high voltage switch 36 and is used to modify the beam path to prevent color fringing or to obtain convergence of the three color rasters. An electron beam 40, emanating from the cathode electrode of the kinescope 20 is shown to follow one of three different paths from a position just prior to the mesh 33 to a particular landing position on the screen.

The screen 34 is switched sequentially from a first voltage to a second voltage to a third voltage ranging from about 10 KV to over 20 KV to energize the red, green and blue phosphors $P_1$, $P_2$ and $P_3$ respectively. The change in screen voltage causes a change in beam velocity which permits the selective energization of the phosphors. However, as the beam velocity increases, the deflection sensitivity decreases, causing a smaller raster. To compensate for this undesirable effect, the mesh 33 is modulated with a complementary voltage. For red signals, the lowest voltage is applied to the screen 34 and the highest to the mesh 33. The electron beam then follows the path 43. For green signals, intermediate voltage values are applied to both the screen 34 and mesh 33. For blue signals, the screen 34 is at the highest voltage and the mesh 33 at the lowest, and the beam follows the path 41. The resultant effect is to modify the beam trajectories as the screen 34 is switched so as to cause the red, blue and green rasters to coincide.

The H.V. switch 36 functions to provide three levels of voltage to the screen 34 and also three levels of voltage to the mesh 33. Because of the maintenance of a fixed voltage on the funnel coating 35 of the kinescope, a well formed, small diameter beam is provided. This permits improved registration of sequentially scanned lines, and provides insensitivity to the beam to stray magnetic fields of normally expected intensities.

Figure 2:
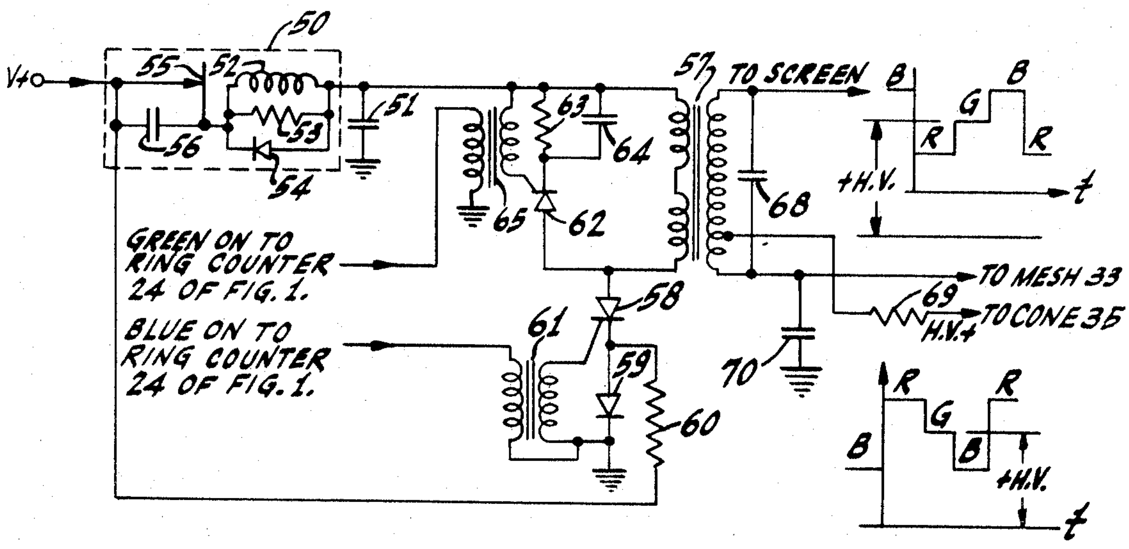
FIG. 2 is a schematic circuit diagram of a high voltage switching generator embodying this invention.

The high voltage generator shown in FIG. 2 provides the three level high voltage switching waveforms for the screen 34 and mesh 33 of the kinescope 20 shown in FIG. 1.

An overload relay 50 and associated components are connected in series with a silicon controlled rectifier or thyristor triggering circuit. The overload really 5 includes a relay coil 52 having a terminal connected to one arm of the normally open contact 55 of the relay. The other arm of the contact 55 is coupled to the +V supply. A current sensitivity establishing resistor 53 is coupled across the coil 52, as is a diode 54. The diode 54 is used to limit the amplitude of voltage transients across the coil when current is interrupted therethrough. Capacitor 56 serves to protect the relay contacts 55 against voltage surges.

The output of the V+ supply is filtered by capacitor 51 connected between a terminal of the relay coil 52 and ground. The V+ voltage is applied through the primary winding of a transformer 57 to the anode of a silicon controlled rectifier (S.C.R.) 58. A semiconductor diode 59 having its anode coupled to the cathode of S.C.R. 58 provides a return path to ground. The junction formed between the anode of diode 59 and the cathode of S.C.R. 58 is returned to the +V supply through resistor 60. The gate electrode of S.C.R. 58 is coupled to ground through the secondary winding of a pulse transformer 61, the primary winding of which, has a terminal coupled to ground. The other terminal of the primary winding of transformer 61 is coupled to an output 32 of the ring counter circuit 24 of FIG. 1, and receives a pulse representative of the start of the blue scan sequence.

A second S.C.R. 62, has an anode electrode coupled to one terminal of the transformer 57 primary winding. The cathode electrode of S.C.R. 62 is coupled through a resistor 63, bypassed by capacitor 64, to the other terminal of the primary winding of transformer 57. S.C.R. 62, and its associated circuitry thus shunts the primary winding of transformer 57. The gate electrode of S.C.R. 62 is coupled through the secondary winding of a pulse transformer 65 to the junction of capacitor 51 and relay coil 52. The primary winding of transformer 65 is coupled between ground and an output 31 of ring counter 24 of FIG. 1, to receive a pulse during the green scan.

A capacitor 68 is coupled across a voltage step up secondary winding of transformer 57. The upper terminal of transformer 57 secondary winding is coupled to the screen electrode 34 of a kinescope 20 of FIG. 1, while the bottom or lower terminal is coupled to the mesh electrode 33, of the kinescope 20. A high level DC voltage is applied to a tap on the secondary winding of transformer 57 via a resistor 69. The lower terminal of the secondary winding of transformer 68 is shunted to ground by a capacitor 70.

Operation of the circuit shown in FIG. 2 is as follows. S.C.R. 58 is turned on by the application of a trigger pulse from the ring counter to the primary of transformer 61. The trigger pulse is applied to the gate electrode of S.C.R. 58 causing it to conduct through the primary winding of transformer 57 to ground. This action causes a current to flow through the primary winding of transformer 57. A stepped up voltage is developed at the secondary winding of transformer 57 and capacitor 68 charges to this voltage level, a portion of which level is superimposed upon the +HV coupled via resistor 69 to the secondary tap. When capacitor 68 is fully charged, the transformer primary current decreases to a value less than that required to maintain the S.C.R. 58 in conduction and the S.C.R. 58 becomes an open circuit. After the S.C.R. 58 opens, the capacitor 68 begins to discharge through the secondary winding of transformer 57. That portion of the voltage from the tap on the secondary winding to the upper terminal added to the +HV voltage represents the blue excitation voltage which would be applied to the screen electrode of the kinescope. The mesh electrode receives a potential represented by the difference between the voltage from the tap to the lower terminal of the secondary winding and that of the +HV supply.

Capacitor 68 starts to discharge through the secondary winding of transformer 57 as soon as the S.C.R. 58 turns off. About 53 microseconds later, which is approximately the duration of a horizontal line, the discharge current from capacitor 68 increases sufficiently to saturate the core of the transformer 57. The transformer 57 has a saturable core of substantially square loop material. The discharge time constant of the capacitor 68 and the secondary winding, when the core is unsaturated, is such as to cause the secondary current to saturate the core in about 53 microseconds.

Due to saturation, the effective inductance of the transformer 57 decreases. The low inductance of the transformer 57 together with the value of capacitor 68 act as a resonant circuit and energy is transferred rapidly from capacitor 68 to the inductance of the secondary winding and back to the capacitor, causing the voltage across capacitor 68 to reverse polarity. As the capacitor voltage reverses polarity the transformer 57 core comes out of saturation, and the discharge time constant is as mentioned above. This state corresponds to the red voltage level applied to the screen electrode 33 of the penetration kinescope 22. The voltage from the tap of transformer 57 secondary winding to the upper terminal is of a polarity to subtract from the +HV voltage. The mesh voltage is higher because the voltage from the tap of the transformer 57 secondary to the lower terminal appears in series aiding with the +HV voltage.

Energy continues to be transferred from the capacitor 68 to the inductance of the secondary winding of transformer 57, and if the cycle were allowed to continue, the transformer core would saturate and the windings would "switch" inductance to the low value state. However, before this occurs a green trigger pulse is applied from ring counter 24 of FIG. 1 through transformer 65 to gate S.C.R. 62 into conduction. The charge across capacitor 68 is rapidly transferred to capacitor 64 during the retrace interval via transformer 57. When the transferral of charge is complete, S.C.R. 62 turns off. The charge on capacitor 64 is dissipated in resistor 63. The value of resistor 63 and capacitor 64 are chosen so that the remaining voltage on capacitor 68 is near zero when S.C.R. 62 turns off. This level represents the green scan level which corresponds to +HV applied to the screen of the kinescope and +HV applied to the mesh. The wave shapes of the resultant voltages are shown in FIG. 2, for the screen and mesh. The circuit described requires only one charging cycle for producing the three step waveform instead of two and therefore reduces the power requirement by one half.

Figures 2A, 5:
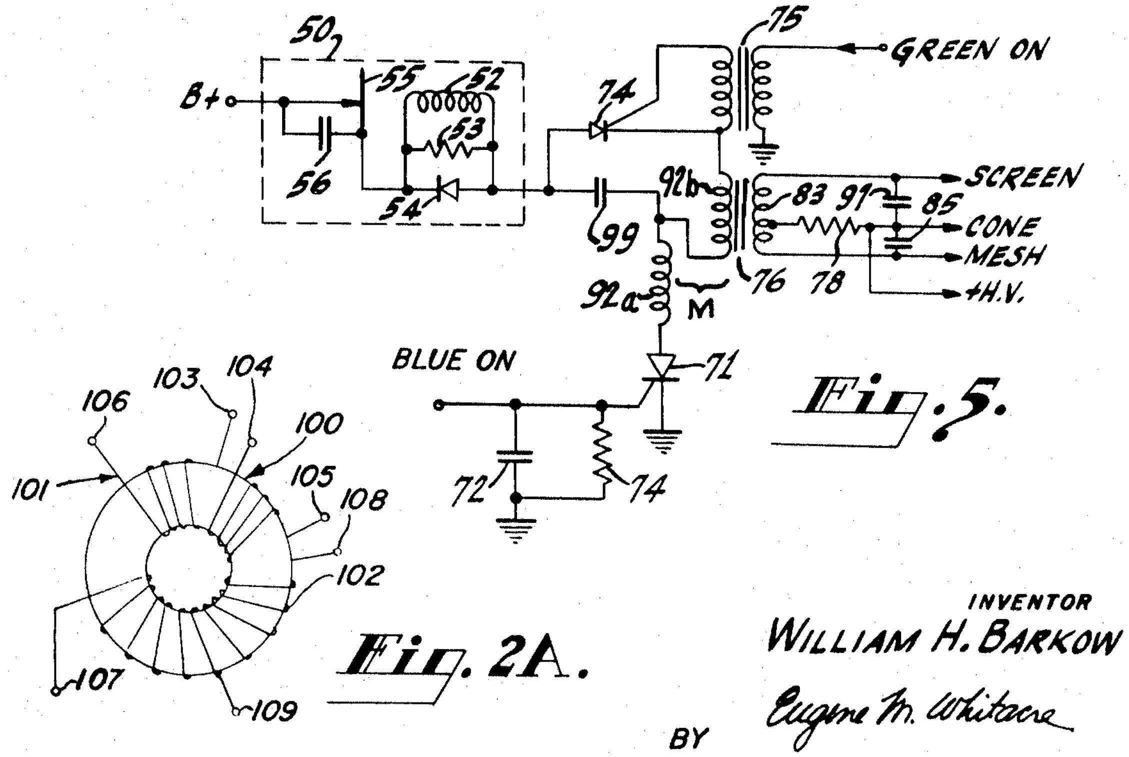
FIG. 2A is a plan view of a toroid transformer configuration useful in the high voltage switching generator shown in FIG. 2.
FIG. 5 is a schematic circuit diagram of a staircase generator employing a series connected energy recovery capacitor.

FIG. 2A shows a toroidal core 100 fabricated from a square loop ferrite material such as those ferrites used in deflection transformers. The primary winding 101 typically comprises 100 turns of No. 30 wire, implemented by 50 turns and 50 turns equally distributed about the core 100.

A secondary winding 102 is wound in multiple sections about the core 100 and may comprise 2,430 turns with a 270 turn tap.

The primary winding 101 is bifilar wound and the secondary 102 is wound in sections to minimize voltage stress of the wire insulation between turns of the winding.

In operation of the toroidal transformer of FIG. 2A is connected in the circuit shown in FIG. 2 as follows. The two primary windings are connected in series by connecting terminal 103 to 104. Terminal 105 is then connected to the junction of resistor 63 and capacitor 64 of FIG. 2. Terminal 106 is connected to the anode of S.C.R. 58.

Capacitor 68 is connected across terminals 107 and 108 of the secondary winding, while the secondary tap 109 is coupled to the H.V.+ supply via resistor 69.

Figure 3:
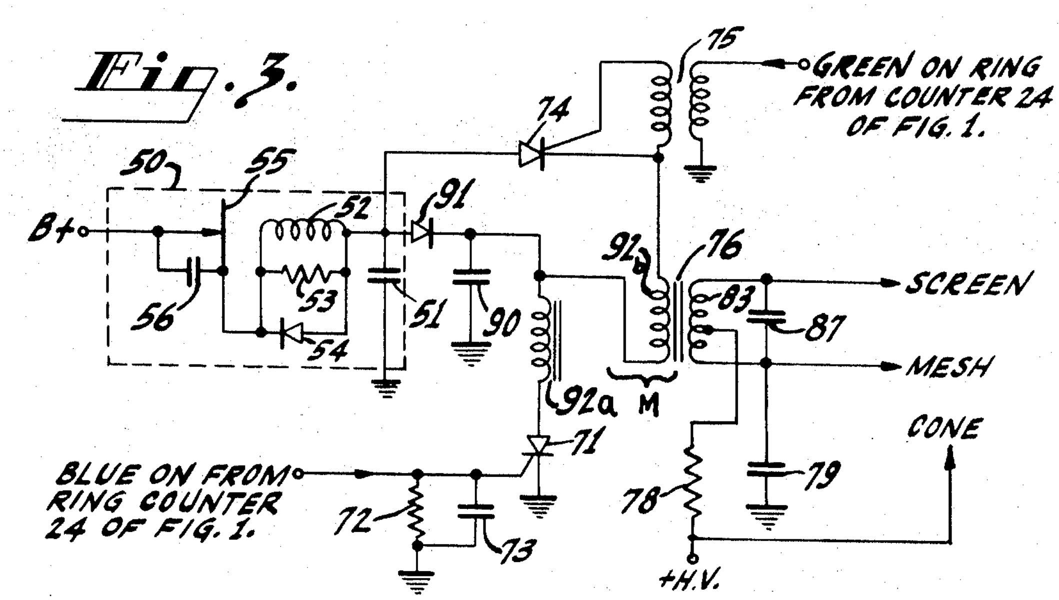
FIG. 3 is a schematic circuit diagram of another staircase potential generator embodying the invention.

FIG. 3 shows a triple staircase generator employing an energy recovery capacitor 90.

Figure 4:
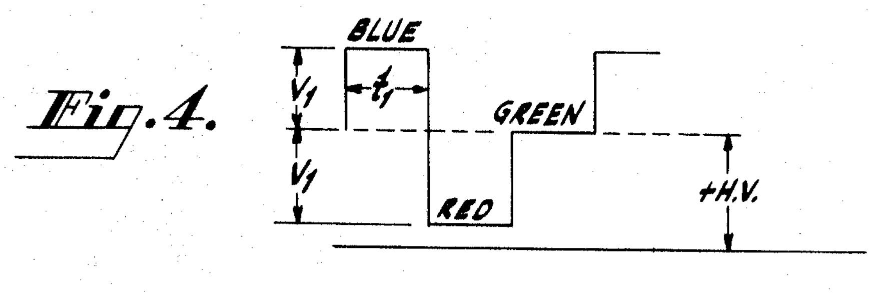
FIG. 4 is a graph of a stepped voltage waveshape characterizing the potential output of a staircase generator.

The circuit of FIG. 3 operates as follows. The S.C.R. 71 is triggered on by the application of a sync pulse or trigger pulse representing the blue line scan and applied between the gate electrode of S.C.R. 71 and ground. The gate electrode is returned to ground through resistor 72 and capacitor 73 forming an R.C. filter to prevent spurious noise pulses from falsely triggering S.C.R. 71. When S.C.R. 71 is turned on representing the blue line scan, B+ is coupled to ground via diode 91, the primary winding 92*a* of transformer 76 and the anode to cathode path of S.C.R. 71. The B+ voltage impressed upon primary winding 92*a* is stepped up, in accordance with the turns ratio between the primary winding 92*a* and the secondary winding 83, of transformer 76. Capacitor 87 across the secondary winding 83 charges to the stepped up voltage. As capacitor 87 is charging, the current in the primary winding 92*a* decreases. When capacitor 87 is fully charged there is no longer sufficient holding current to maintain conduction through S.C.R. 71 and hence the S.C.R. 71 reverts to the nonconducting state. Capacitor 90 in shunt with the primary winding 92*a* and the anode to cathode path of S.C.R. 71 is selected to be much larger than capacitor 87. Capacitor 90 is initially charged to B+ and effectively serves as the B+ supply for the S.C.R. 71 and primary winding 92. When capacitor 87 is charged the potential applied to the screen is that portion of the voltage from the tap on the secondary winding 83 to the upper terminal thereof plus the + HV supply. This potential, as shown in FIG. 4, represents the blue level. As soon as S.C.R. 71 reverts to the nonconducting state, capacitor 87 begins to transfer energy to the secondary inductance 83 of transformer 76. Transformer 76 has a core of a ferro magnetic material having a square loop hysteries characteristic. The core which may be a toroid configuration has the ability to switch rapidly. Core switching is accomplished when a square loop magnetic material has a sufficient magnetic field or magnetizing force impressed upon the core to bias the material in a saturation region. Examples of such material are transformer deflection core type ferrites with high permeabilities. Suitable materials may exhibit inductance changes of 1000 to one.

The inductance of the secondary winding 83 is therefore high for low currents. As energy is transferred to the secondary winding inductance 83 from the capacitor 87, the current through the secondary winding 83 increases. Until at the end of the duration of one horizontal line or approximately 53 microseconds ($T_1$ FIG. 4), there is sufficient current in the secondary winding to saturate the core material. The saturation of the core material causes the inductance of the secondary winding 83 to decrease abruptly and rapidly. This decrease in inductance, at the end of period $t_1$, FIG. 4), then raises the resonant frequency of the capacitor 87 and secondary inductance combination. Therefore the capacitance 87 rapidly transfers all the remaining energy stored therein to the secondary inductance 83 which rapidly retransfers this energy also at the increased resonant frequency, and charges capacitor 87, to the opposite polarity. Due to this polarity reversal across capacitor 87 the voltage applied to the screen is equal to the difference between +HV and $V_1$ (FIG. 4). This voltage difference represents the red scan, and is the level applied to the screen of the kinescope. The capacitor 87 again begins to transfer energy to the secondary inductance 83, which transfer, if allowed to continue, would result in a second core switch. However, just prior to this time, a green on pulse from the ring counter of FIG. 1 is applied to the primary winding of a pulse transformer 75. The secondary winding of transformer 75 applies the pulse to the gate of S.C.R. 74. The pulse switches S.C.R. 74 to the conducting state. The low impedance anode to cathode path to S.C.R. 74 shunts the top primary winding 92*b*, across the diode 91. Primary windings 92*a* and 92*b* are on the same core and are mutually coupled to each other and to the secondary winding. Accordingly, a primary winding 92 comprises windings 92*a* and 92*b*. The turns ratio between that portion of the primary winding 92*b* and the secondary winding 83, determines the voltage level impressed thereon from the capacitor 87. Capacitor 90 charges to this voltage level, which is greater than the B+ or initial level. This action occurs rapidly and all charge of capacitor 87 is transferred during the retrace interval. When capacitor 90 is charged, the current through primary 92 and therefore through S.C.R. 74 drops to zero, thus returning S.C.R. 74 to the nonconducting state. As capacitor 87 is discharged the voltage applied to the screen is +HV and represents the green scan mode (FIG. 4). The capacitor 87, in turn, may be discharged to some other level, not zero, and therefore the voltage would be higher than +HV, but not as high as that required for the blue scan. FIG. 3 shows the connections of the secondary to the mesh and cone, for providing levels thereacross as those indicated in the description of FIG. 3.

Due to the fact that the above levels are generated at the horizontal line rate (i.e. ≈15,750 c.p.s.) the energy recovery afforded by transferring charge to capacitor 90 is substantial and advantageous, as producing more efficient circuit operation from a power requirement view point. Diode 91 prevents capacitor 90 from discharging back through the B+ supply.

From the above description of FIGS. 2 and 3 the characteristics of transformers 57 and 76 can be generally stated. The leakage inductance of the transformers must be low enough to allow charging of capacitors 68 and 87 during the horizontal retrace time. The open circuit transformer secondary reactance or inductance must be high enough to prevent excessive loading of capacitors 68 and 87 during the trace or scan interval. Since the transformers operate at the horizontal retrace frequency the core used should have low losses at this rate. The cores of the transformers should also have square loop magnetic properties since both circuits use core switching to reverse the charge on capacitors 68 and 87.

The turns ratio of the portion of the primary winding 92*a* of FIG. 3 to the secondary winding 83 determines the amplitude of the $V_1$ steps in FIG. 4. The number of turns on primary 92*b* also effects the voltage across capacitor 90 which is essentially the effective primary voltage, as described.

The circuit of FIG. 5 shows a similar configuration as that of FIG. 3, with an energy recovery capacitor 99 in series with the primary winding 92 and the anode to cathode path of the S.C.R. 71. Similar reference numerals have been retained to indicate similar functioning components as in FIG. 3.

The secondary winding 83 of transformer 76 has +HV applied to a tap via resistor 78, which serves to isolate the +HV supply from the charging voltage waveform at the secondary, resistor 78 could be replaced by an isolating coil or inductor. Shunted across the secondary, are capacitor 97 and capacitor 85 which may include the values of the shunt capacitance between the screen and mesh electrodes and the cone of the penetration kinescope. The automatic reset relay circuitry included in rectangle 50, serves again to return S.C.R. 71 to its nonconducting state if a short, such as an arc between the kinescope screen and mesh occurs.

The circuit operates as follows. A blue sync pulse representing the start of the blue scan triggers S.C.R. 71 into conduction via the application of the pulse to the gate electrode of S.C.R. 71. The anode to cathode path of S.C.R. 71 provides a ground return through the large capacitor 99 for the B+ level and through the relay coil 52, shunt resistor 53, the anode to cathode path impedance of the S.C.R. 71 and the primary winding 92*a*. The charge current through primary winding 92*a* produces a voltage change thereacross which is transformed via the transformer 76 and charges capacitors 97 and 85. When capacitors 97 and 85 are charged the primary current decays towards zero and S.C.R. 71 is no longer sustained in the conducting state and therefore reverts to the nonconducting condition. The potential across capacitor 97 adds to the +HV potential applied to the secondary to provide a voltage to the screen of the kinescope sufficient to velocity modulate the electron beam for blue phosphor excitation. The voltage across capacitor 85 subtracts from +HV and the difference is applied to the mesh to aid in convergence of the blue beam.

Capacitors 97 and 85 start to transfer energy to the inductance of the secondary winding 83 at a rate determined by the L-C product. As the energy stored by the capacitors is transferred to the inductance to be stored as magnetic energy, the core, after a given interval, which is equal to one horizontal line, has sufficient energy to saturate. At this time the effective secondary inductance decreases and the transfer of energy from the capacitors 97 and 85 to the secondary inductance, and therefrom back to the capacitors 97 and 85 occurs rapidly. The exact time determined by the higher resonant frequency and the speed of the core switching. This transfer causes capacitors 97 and 85 to charge to the same voltage level as previously, but of opposite polarity due to the resonant energy transfer process. The resultant screen voltage is the difference between +HV and the voltage across capacitor 97, while the mesh voltage is the sum of the +HV and the voltage across capacitor 85.

As before capacitors 97 and 85 transfer energy to the secondary winding 83 and the inductance, saturation sequence would occur again. However, before saturation can take place the S.C.R. 74 is triggered into conduction by a green scan pulse applied to the primary winding of transformer 75 and via the secondary winding to the gate electrode of S.C.R. 74. The anode to cathode low impedance path of S.C.R. 74 is coupled across the series path of capacitor 99 and a portion of the primary winding 92*b*. Energy from capacitors 97 and 85 is transferred via the transformer to charge capacitor 99 rapidly. By this technique a voltage is added across capacitor 99, thus providing energy recovery. As soon as capacitor 99 is charged, primary current flow ceases and S.C.R. 74 reverts to the nonconducting state. During this mode capacitors 97 and 85 are discharged and the voltage applied to the screen and mesh is the +HV level.

Specific examples of circuit components used will be given for those configurations shown in FIG. 2.

The following levels were applied to a penetration kinescope of the type described in FIG. 1 and operating in a line sequential mode. These voltages provide good registration and brightness associated with the color display for red, green and blue phosphors.

| Color | Screen 34 v. | Mesh 33 v. | Funnel 35 v. |
|---|---|---|---|
| Red | 10.4 kv. | 16.56 kv. | 16 kv. |
| Green | 16.0 kv. | 16.00 kv. | 16 kv. |
| Blue | 23.4 kv. | 15.26 kv. | 16 kv. |

Although the above voltages may vary with the penetration phosphor design the changes in mesh voltage is approximately 10 percent of the change in screen voltage.

The staircase wave shape generator of FIG. 2 produced the screen and mesh waveforms at the above voltage levels using the following components.

| | |
|---|---|
| V+ | +200 v. at 150 Ma. |
| Relay 52 and associated contact | A410-061650-01 Guardian or equivalent, 6 v. coil |
| 55 | |
| Resistor 53 | 27 ohms |
| Resistor 60 | 15,000 ohms |
| Resistor 63 | 25 ohms |
| Resistor 69 | 2,000,000 ohms |
| Capacitor 56 | 0.003 microfarads |
| Capacitor 64 | 0.18 microfarads |
| Capacitor 68 | 70 micromicrofarads |
| Capacitor 70 | 500 micromicrofarads |
| Transformer 61 and 65 | UTC United Transformer Co. 051 pulse transformer |
| Transformer 57 | Toroid core G-L Electronics No. GL3811-A4012 or equivalent, 100 turns No. 30 wire primary, 2430 turns 18 sections secondary and 270 turns 2 section tapped between the 2430 turns and 270 turns |

The 20 sections are to minimize voltage stress of the wire insulation between turns of the winding Complete transformer 57 was operated in oil to minimize the corona and voltage breakdown. The primary is bifilar wound over the insulated nickel alloy or ferrite type wound core.

| | |
|---|---|
| S.C.R. 58, 62 | 2N689 or 2N3228 |
| Diode 59 | 1N3254 |
| +HV | 16,000 volts |

What is claimed is:

A staircase generator circuit, comprising:

a. an inductive element having a winding on a core of square loop magnetic material, b. capacitive means effectively in parallel with at least a portion of said winding, c. circuit means including a switch and a voltage supply coupled to said inductor, d. means for activating said switch to cause a voltage to be developed across said winding for charging said capacitive means during a first interval of time, e. said capacitive means and said winding having parameters such that said capacitive means discharges through said winding in a first direction at a rate causing said core to saturate after a second interval of time, f. said capacitive means and the inductance of said winding when said core is in said saturated condition being oscillatory at a frequency such that the charge on said capacitive means is reversed during a third interval of time due to the transfer of energy from said inductance at said saturated condition to said capacitive means whereupon said core reverts to the unsaturated condition, g. said capacitive means discharges through said winding in a direction opposite to said first direction for a fourth interval of time.

2. The staircase generator circuit as defined in claim 1 wherein said first and third intervals of time are substantially equal to the horizontal retrace time of a television signal and said second and fourth intervals of time are substantially equal to the line scan periods of a television signal.

3. Apparatus for producing a staircase waveshape comprising:

a. an inductance comprising a winding on a core having square loop magnetic characteristics, a capacitance connected in resonant circuit combination with said inductance, c. means including a first semiconductor switching device, for coupling energy to said resonant circuit in a first mode to charge said capacitance to a first potential level of a given polarity when said switch is activated, said capacitance transferring said energy to said inductance at a rate determined by said resonant circuit frequency, said inductance changing value to a lower inductance determined by said core characteristics, to rapidly transfer energy back to said capacitance in a second mode for charging said capacitance to said first potential level of a polarity opposite to said given polarity, d. means including a second semiconductor switch coupled to said resonant circuit for discharging said capacitance after a predetermined time interval less than the time required for said resonant energy transfer to occur when said second switch is activated.

4. Apparatus according to claim 3 wherein said means for coupling energy to said resonant circuit comprises:

a. a transformer having a primary winding inductively coupled with said inductance, which serves as a secondary winding, b. a source of DC potential, c. a silicon controlled rectifier coupling said source to said primary winding and selectively operative to form a low impedance path between said primary winding and said source when in a conducting mode.

5. Apparatus as set forth in claim 3 wherein said core is of a toroid configuration fabricated from a high permeability ferrite material.

6. Apparatus for producing a staircase potential waveform comprising:

a. a transformer having a secondary and a primary winding mutually coupled on a core of square loop magnetic material, b. first capacitive means coupled across said secondary winding forming a resonant circuit at a first frequency with the inductance of said secondary winding, c. means including a switch for selectively coupling electrical energy into said primary winding, said energy being coupled to said secondary winding via said transformer to charge said first capacitive means to a first potential level of a given polarity, said first capacitive means transferring sufficient energy to said inductance of said secondary winding at a rate determined by said first frequency to lower said magnitude of said inductance by core saturation, whereby said remaining energy stored by said first capacitive means is rapidly transferred to said inductance and back to said first capacitive means to rapidly charge said means to substantially said first potential level and of a polarity opposite to said given polarity, d. a second capacitance coupled to a portion of said primary winding, e. switching means coupled to said portion of said primary winding for selectively decreasing the impedance of said primary winding to cause said second capacitance and said decreased impedance to load said transformer for transferring the charge stored on said first capacitive means to said second capacitance via said transformer.

7. The apparatus according to claim 6 wherein said switching means comprises a silicon controlled rectifier having a cathode electrode coupled to a terminal of said portion of said primary transformer and an anode electrode coupled to a terminal of said second capacitance.

8. Apparatus for producing a staircase potential waveform comprising:

a. a transformer having a secondary and a primary winding mutually coupled on a core comprising a material having square loop magnetic characteristics, b. capacitive means in shunt with said secondary winding forming a resonant circuit at a first frequency with the inductance of said secondary winding, c. means for selectively coupling electrical energy into said primary winding, said energy being coupled to said secondary winding via said transformer to charge said capacitive means to a first potential level of a given polarity, said capacitive means transferring sufficient energy to said inductance of said secondary winding at said first frequency to cause said inductance of said winding to become substantially lower in magnitude at a predetermined time in accordance with said square loop characteristic of said core, whereby said remaining energy stored in said capacitance is rapidly transferred to said inductance and back to said capacitive means at a second higher frequency determined by said low magnitude inductance, said capacitive means being charged by the retransferred energy to substantially said first potential level and of a polarity opposite to said given polarity.

d. means including a switch for a second capacitor coupled to said primary winding for transferring said charge on said capacitive means through said transformer winding to said second capacitor.

9. A switching circuit comprising:

a. an inductive element having a winding on a core of square loop magnetic material, b. capacitive means effectively in shunt with at least a portion of said winding, c. a first circuit including a second capacitance and a first switch coupled to the winding for charging said capacitive means to a first potential level when said switch is activated, d. a second circuit including a second switch coupled to the winding for transferring the charge on said capacitive means to said second capacitance when said second switch is activated, e. a voltage source connected in series with said second capacitance when one of said first or second switches are activated.

10. The switching circuit according to claim 9 wherein said first and second switches are silicon controlled rectifiers.

11. A staircase waveform generator, comprising:

a. a primary and secondary inductive winding mutually coupled on a common core of a square loop magnetic material, b. a first capacitor effectively in parallel with at least a portion of said secondary winding, c. first circuit means, including a first switch and a voltage supply, coupled in shunt with a portion of said primary winding, d. first means for activating said first switch to cause said voltage supply to be applied across said portion of said primary to charge said first capacitor to a potential level in accordance with the turns ratio between said portion of said secondary and primary windings, e. said first capacitor and said secondary winding having parameters such that said first capacitor discharges through said secondary winding in a first direction at a rate causing said core to saturate after a predetermined interval of time, f. said first capacitor and said secondary winding inductance being oscillatory when said core is in said saturated condition, at a frequency such that the charge on said first capacitor is reversed in polarity during a third interval of time, whereupon said core reverts to the unsaturated condition, g. said first capacitor discharging through said winding in a direction opposite to said first direction for a fourth interval of time, h. second circuit means, including a second capacitor and a second switch, coupled to said primary winding, i. second means for activating said second switch to cause said charge on said first capacitor to be transferred to said second capacitor across said windings, at a time less than that required to saturate said core.

* * * * *